United States Patent
Chou et al.

(10) Patent No.: US 6,940,234 B2
(45) Date of Patent: Sep. 6, 2005

(54) ELECTRIC ARC DISCHARGE PROTECTION DEVICE

(75) Inventors: Chin-Wen Chou, Taipei Hsien (TW); Eddie Cheng, Taipei Hsien (TW)

(73) Assignee: Zippy Technology Corp., Hsin-Tien (TW)

( * ) Notice: Subject to any disclaimer, the term of this patent is extended or adjusted under 35 U.S.C. 154(b) by 12 days.

(21) Appl. No.: 10/728,760

(22) Filed: Dec. 8, 2003

(65) Prior Publication Data

US 2005/0122066 A1 Jun. 9, 2005

(51) Int. Cl.$^7$ .............................................. H05B 37/00
(52) U.S. Cl. ..................... 315/307; 315/224; 315/291
(58) Field of Search ................. 315/224, 225, 315/291, 307, 308, 244, 219

(56) References Cited

U.S. PATENT DOCUMENTS

| 5,781,418 A | * | 7/1998 | Chang et al. ............... 315/307 |
| 5,952,794 A | * | 9/1999 | Bergman et al. ............ 315/307 |
| 6,515,431 B2 | * | 2/2003 | Moo et al. .................. 315/224 |

* cited by examiner

Primary Examiner—Wilson Lee
(74) Attorney, Agent, or Firm—Birch Stewart Kolasch & Birch, LLP

(57) ABSTRACT

This invention discloses an arc discharge protection device for preventing an arc discharge effect produced by an abnormal phenomenon in the high-voltage output area. After a voltage conversion unit of this arc discharge protection device receives the high-voltage arc discharge signal in the high-voltage output area, the signal is converted into a low-voltage arc discharge signal. A filter unit is provided to determine the potential and filter the abnormal frequency signal, and then the rectify unit will receive the abnormal frequency signal and output an arc wave clutter after the rectification. A touch control unit will detect the arc wave clutter and output a trigger signal to stop the operation of the control unit or the driving unit, and thus achieving the purpose of preventing sparks or burning caused by the heat accumulated in the peripheral components during the arc discharge effect.

9 Claims, 8 Drawing Sheets

ELECTRIC ARC DISCHARGE PROTECTION DEVICE

FIELD OF THE INVENTION

The present invention relates to a protection device used in a high-voltage area which can detect an abnormal phenomenon produced by an electric arc discharge effect, and trigger a control signal to stop the high-voltage output in the high-voltage area.

BACKGROUND OF THE INVENTION

The so-called "Arc Discharge" phenomenon refers to the situation of producing an arc electric spark between two electrodes, when these two electrodes having high voltage between themself are pushed towards each other until they reach a certain distance apart. Such situation is very similar to the lightning produced in a thundercloud, except the lightning fleets and the spark between two electrodes remains for a long time, which will accumulate heat.

In the area of electric circuit, arc discharge usually damages the functions of an electronic component and causes an imbalance to the ecology of electronic circuit. More seriously, the arc discharge may even jeopardize our life and safety. The traditional high-voltage output loading devices (such as a cold cathode tube, an anion generator, and a TV picture tube) are taken for example; the arc discharge phenomenon will occur before the loading device receives the high voltage, due to poor connection, change of temperature and humidity, or damage of some of the components in the electric circuit. Therefore, it is an urgent research and development subject for manufacturers to install an arc discharge protection device at a position where arc discharge occurs in order to avoid damages to the loading device. The solutions to the arc discharge problem focusing on the current design and component include the traditional high-voltage transformer and the step-up device of a ceramic voltage transformer, and their arc discharge protection device is described below:

1. Please refer to FIG. 1 for the general high-voltage transformer or the ceramic transformer. Since such transformer has a fixed operating frequency by itself, and a control unit 11 provides a control frequency, a high-voltage AC voltage will be produced with the alternate operation of these two frequencies. Further, an arc discharge will occur if the output end of a step-up unit 13 breaks or has a small gap due to the improper connection or any other unknown factor. Such arc phenomenon belongs to a high-voltage arc state, which will directly affect the life of the surrounding components, and will also indirectly affect the load 14. Therefore, such transformer usually comes with an electric leakage protection device 30. An electric leakage switch of the short-circuit protection installed inside this electric leakage protection device will be electrically connected when an arc discharge occurs. However, in general, such electric leakage protection device 30 can be installed onto a mechanical device with a smaller vibration only in order to ensure a sufficient fly arc distance in the spurt direction of the electric arc. Therefore, the electric leakage protection device 30 is not recommended at the position with a large mechanical vibration or a strong alternate magnetic field. Harmful factors such water and dust should be taken into consideration for the installation of this electric leakage protection device 30, and additional anti-dust protection measure must be taken. This traditional arc discharge protection device not only has poor application, but also has a high installation cost.

2. Please refer to FIG. 2 for the transformer that uses a piezoelectric plate to constitute the step-up unit 13. The step-up unit 3 comprises a transformer (piezoelectric plate) 131, a circuit board 133, a wiring location 132 for coupling the transformer (piezoelectric plate) 131 and the circuit board 133, and an insert location 134 defined by plugging the component of the circuit board 133 with the load 14. For example, the causes of an arc discharge effect include: (1) break or poor connection at the wiring location 132 due to the change of temperature and humidity; (2) break of transformer (piezoelectric plate) 131 caused by aging or failure; (3) a small gap produced between the male connector and the female socket caused by the aging or improper use of the insert location 134; (4) an electrically connected state generated by the load 14. The aforementioned factors will cause an arc discharge signal occurred to the high voltage outputted from the output end. In FIG. 2, the arc discharge signal is received by the arc deflection device 40, the arc discharge is guided to the grounding, but this device cannot eliminate the arc discharge signal completely, and thus cannot control the operation of the whole circuit. The step-up unit 13 will still have the arc discharge signal remained due to the poor connection or the change of temperature and humidity. Further, in the conduction process to the grounding, the circuit board 133 coupled to the transformer (piezoelectric plate) 131 since the transformer (piezoelectric plate) 131 continues to step up and discharge electricity, it causes an arc discharge effect. Burning may occur due to the heat accumulation or spark. In view of the description above, the prior-art arc discharge protection device cannot completely prevent the arc discharge effect and has many restrictions, and thus such prior-arc device is not popular. The inventor of the present invention thought of a complete arc discharge protection device, which can stop the operation of the whole circuit to prevent damages to the circuit board or other electronic component due to the arc discharge effect when an unsafe condition occurs. This invention can effectively accomplish the purpose of preventing the arc discharge effect.

SUMMARY OF THE INVENTION

The primary objective of the present invention is to provide a protection device to detect and trigger a control signal to stop the high-voltage output in the high-voltage output area when there is an arc discharge effect caused by an abnormal condition.

This invention focuses on the arc discharge effect produced by abnormal conditions in the high-voltage output area; after the high-voltage arc discharge signal of the high-voltage output area is received by the voltage conversion unit of this arc discharge protection device, the signal is converted into a low-voltage arc discharge signal. A filter unit is provided to determine the potential and filter the abnormal frequency signal, and then the rectify unit will receive the abnormal frequency signal and output an arc wave clutter after the rectification. The touch control unit will detect the arc wave clutter and output a trigger signal to stop the operation of the control unit or the driving unit, and thus achieving the purpose of preventing sparks or burning caused by the heat accumulation in the peripheral components during an arc discharge effect. Therefore, this invention directly uses a logic circuit to determine whether or not an arc discharge occurs, and immediately interrupts the high voltage output area if an arc discharge is detected. The cost for assembling the components in accordance with this invention is lower, and can meet the cost-effective requirements better. To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
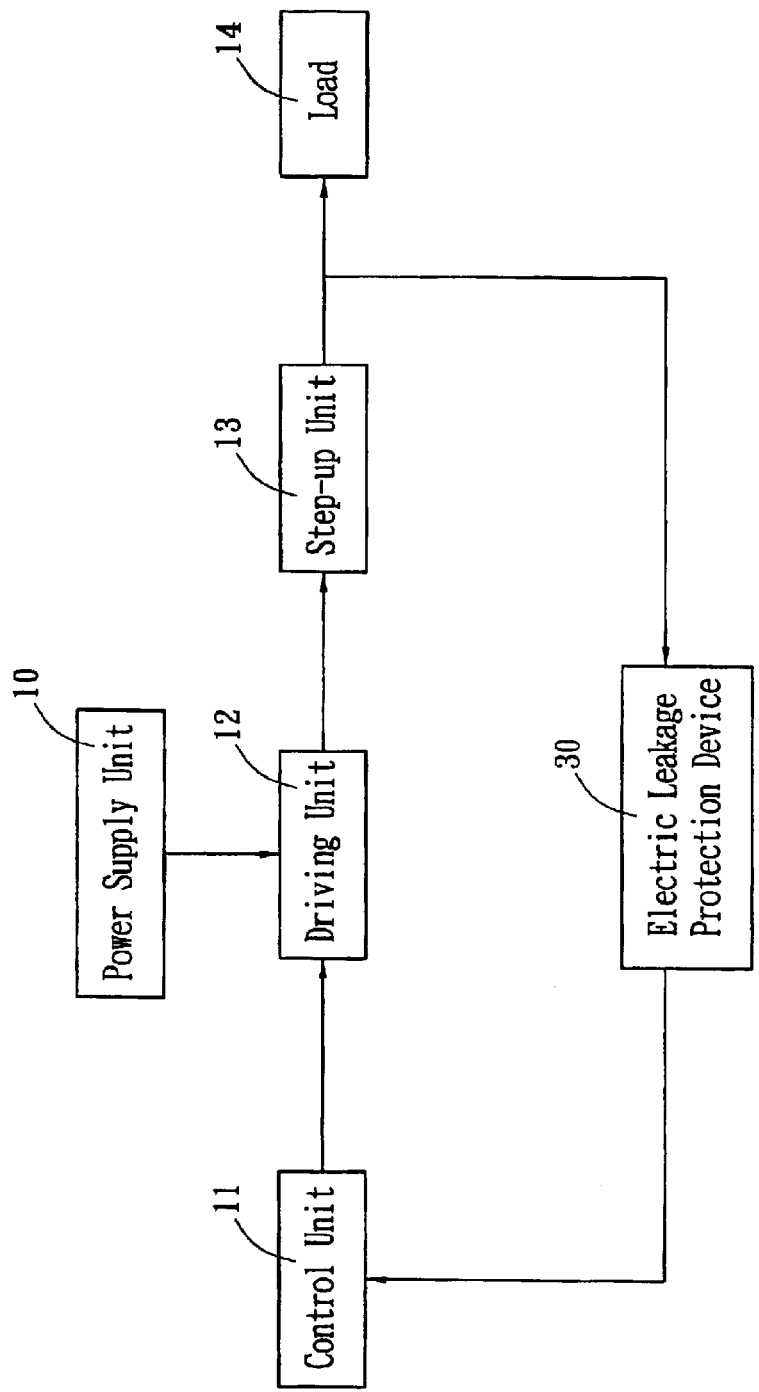
FIG. 1 is a structural diagram of the prior-art electric leakage protection device.
Figure 2:
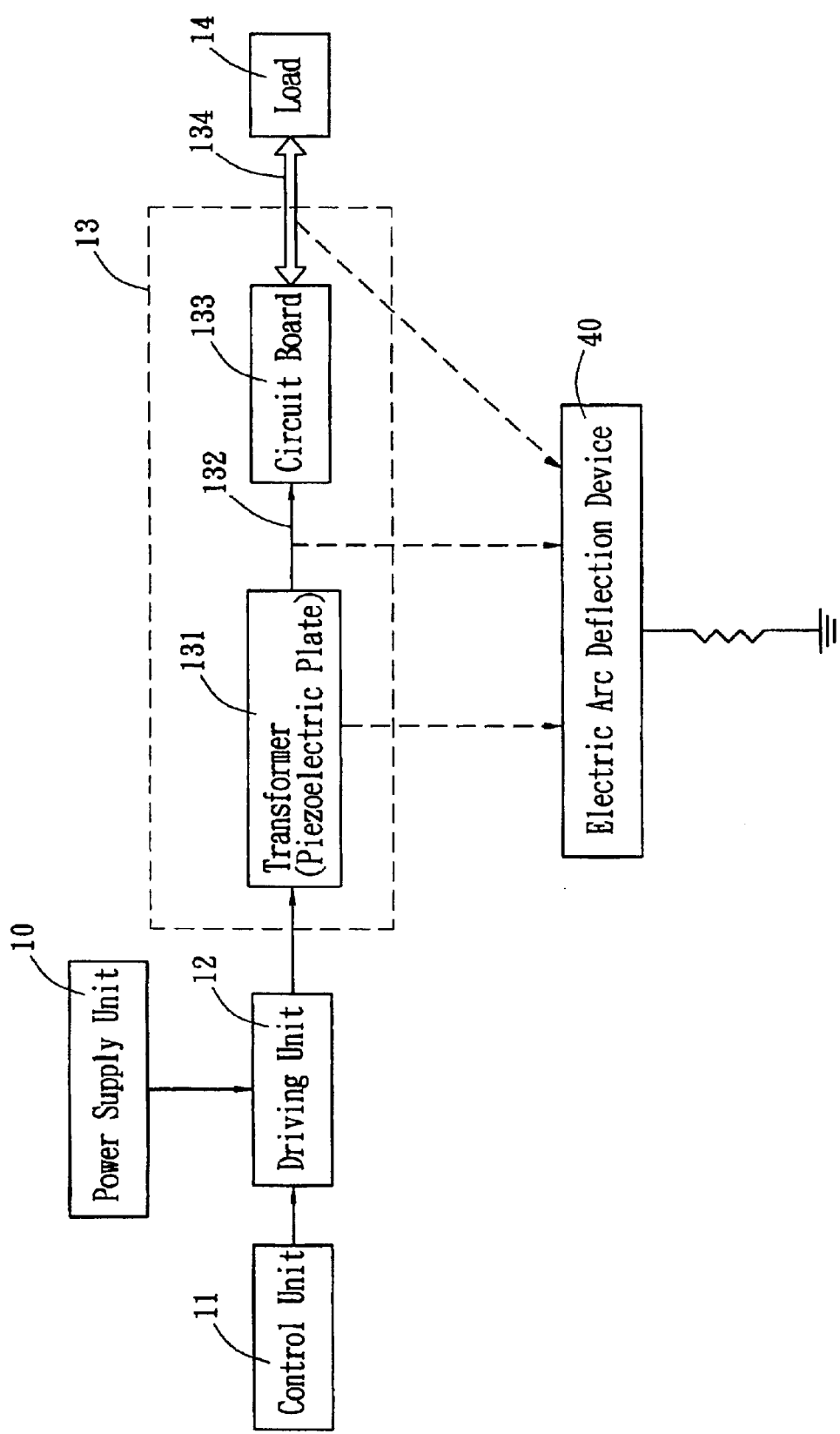
FIG. 2 is a structural diagram of the prior-art arc deflection device.
Figure 3:
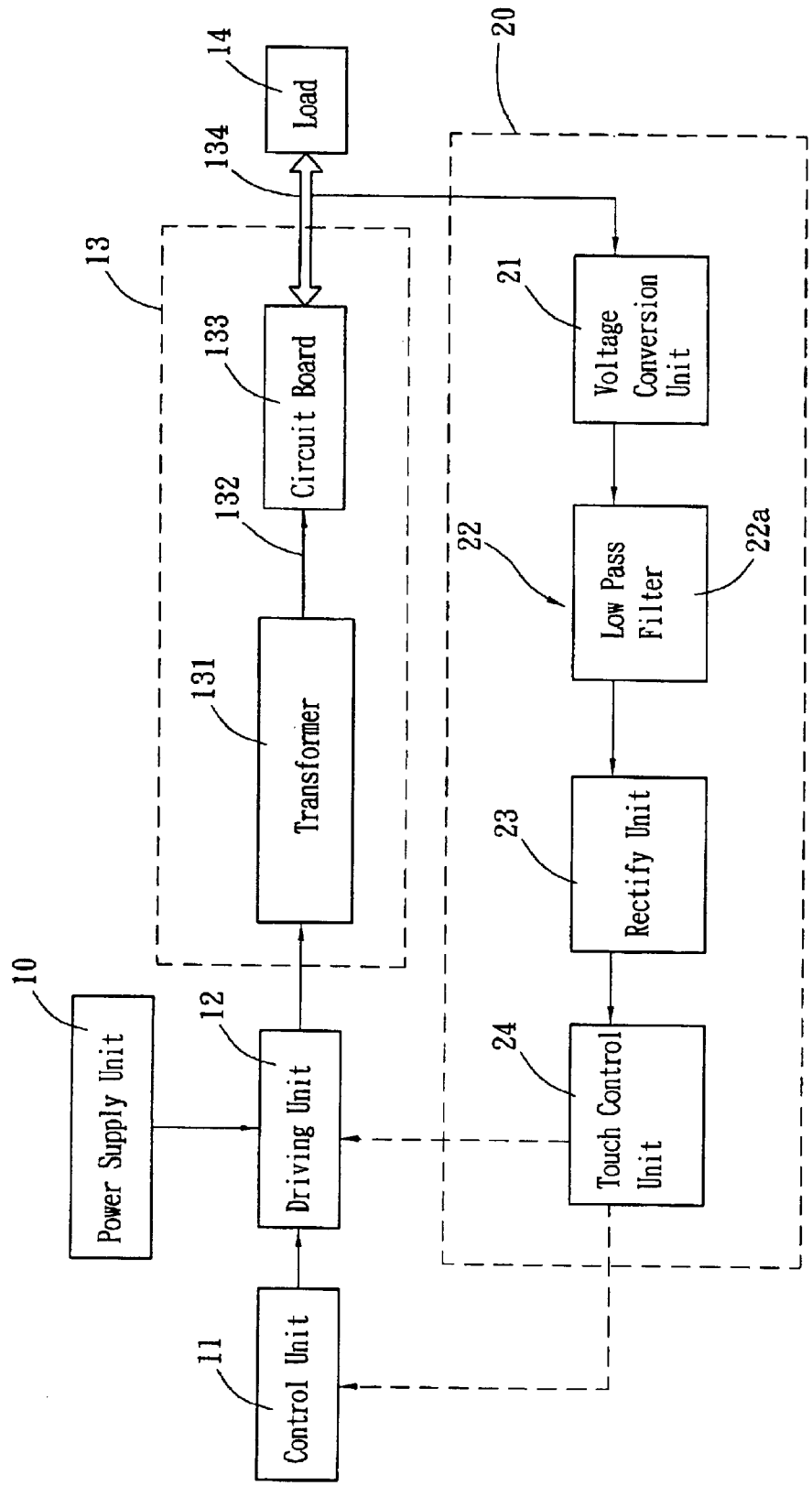
FIG. 3 is a block diagram of the circuit of a low pass wave filter of this invention.

Please refer to FIG. 3 for the arc discharge protection device 20 of this invention used to prevent an arc discharge effect produced by abnormal phenomenon in the high-voltage output area. Such high-voltage output area comprises a power supply unit 10 for supplying power, a control unit 11 for providing a voltage distribution signal, a driving unit 12 for receiving power supply and the voltage distribution signal to convert the voltage, a step-up unit 13 for receiving the voltage after the conversion and converting the voltage to a high voltage, and a load 14 (such load 14 refers an electronic product with a high-voltage drive, such as a cold cathode ray tube or an anion generator, etc.) coupled to the high-voltage output end of the step-up unit 13. Since the principle of the power supply, voltage distribution, voltage conversion, and high-voltage drive in the high-voltage output area are prior arts and not the technical characteristics of this invention, and thus not described here.

The arc discharge protection device 20 of this invention has a high voltage arc discharge signal released from the high-voltage output area. The step-up unit 13 of the embodiment of this invention comprises a transformer 131 and a circuit board 133, and the locations having an arc discharge include the transformer 131 (when it breaks), the wiring location 132 between the transformer 131 and the circuit board 133 (when the wiring location ages or breaks due to the change of temperature and humidity), and the insert location 134 between the circuit board 133 and the load 14 (due to the aging of the insert location 134, or the gap produced between the male plug and the female socket by the improper use. If any of the foregoing factors occurs, a high-voltage arc discharge signal will be produced in the high-voltage output area. Then, after a voltage conversion unit 21 of a voltage divide circuit comprised of a plurality of resistors is connected to the foregoing arc discharge signal, the signal is converted into a low-voltage arc discharge signal, and a filter unit 22 receives the low-voltage arc discharge signal from the foregoing voltage conversion unit 21, and provides a determination on the potential 24 and selects an abnormal frequency signal 2c. This abnormal frequency signal 2c is received by a rectify unit 23 of the rectify circuit comprised of a diode and a capacitor. After the rectification, an arc discharge wave clutter is outputted. After a silicon controlled rectifier or a flip-flop of the contact control unit 24 detects such arc wave clutter, the touch control unit 24 will output a trigger signal to the control unit 11 or driving unit 12 to stop the operation and prevent the arc discharge effect.

Figure 4:
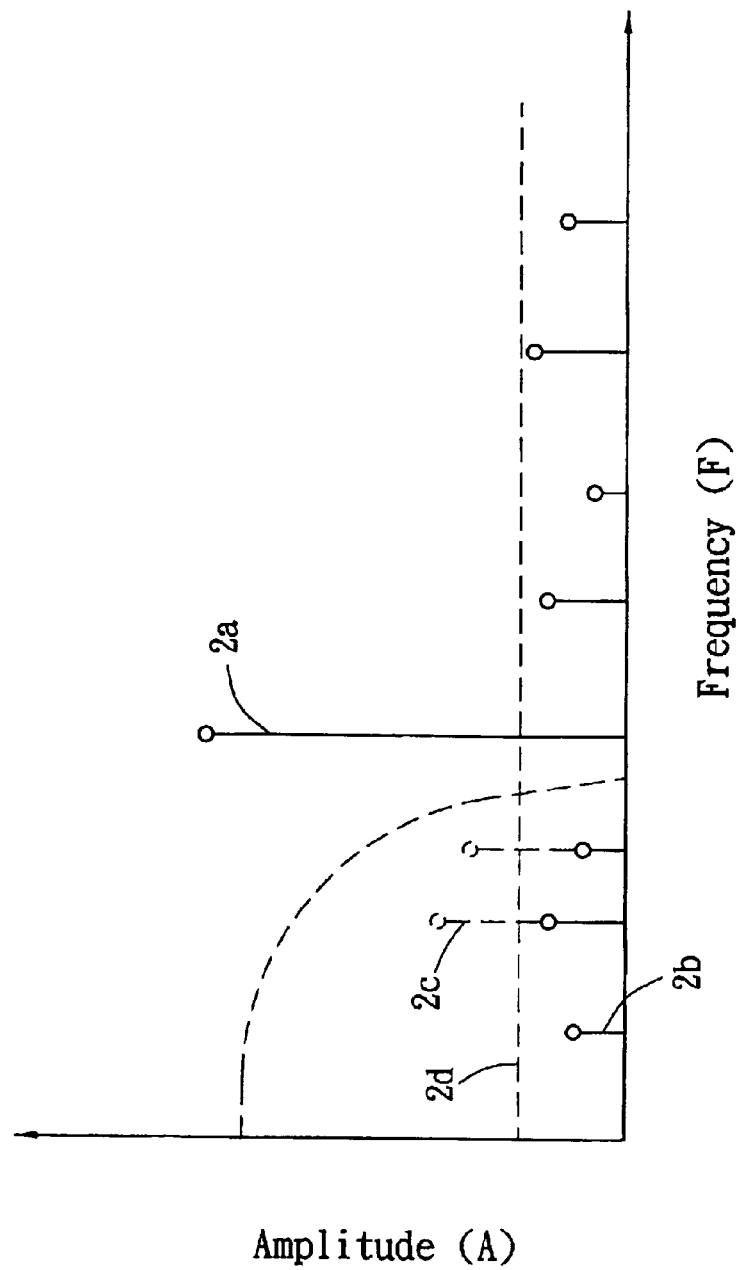
FIG. 4 is an illustrative diagram of the spectrum of FIG. 3.
Figure 5:
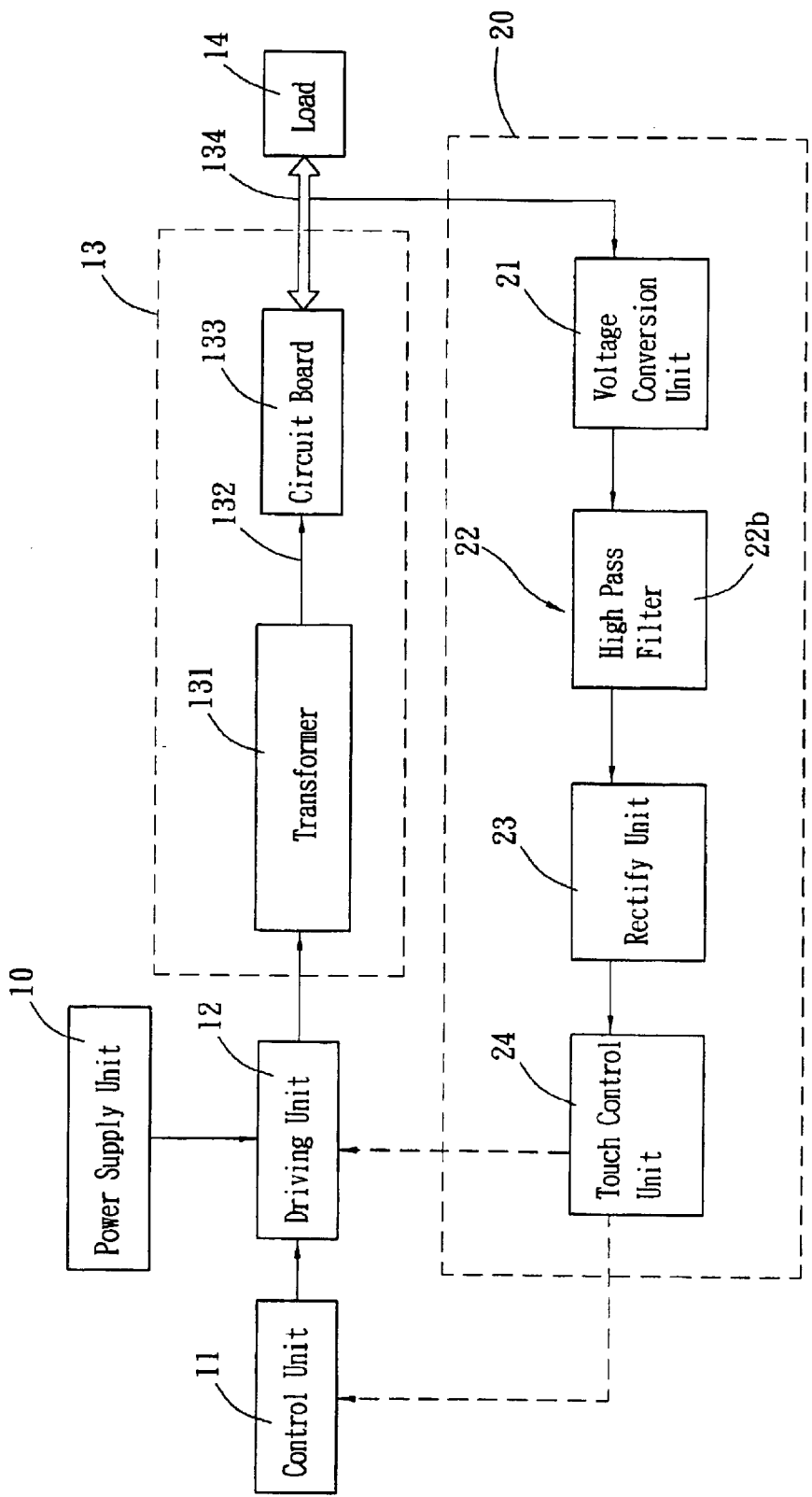
FIG. 5 is a block diagram of the circuit of a high pass wave filter of this invention.
Figure 6:
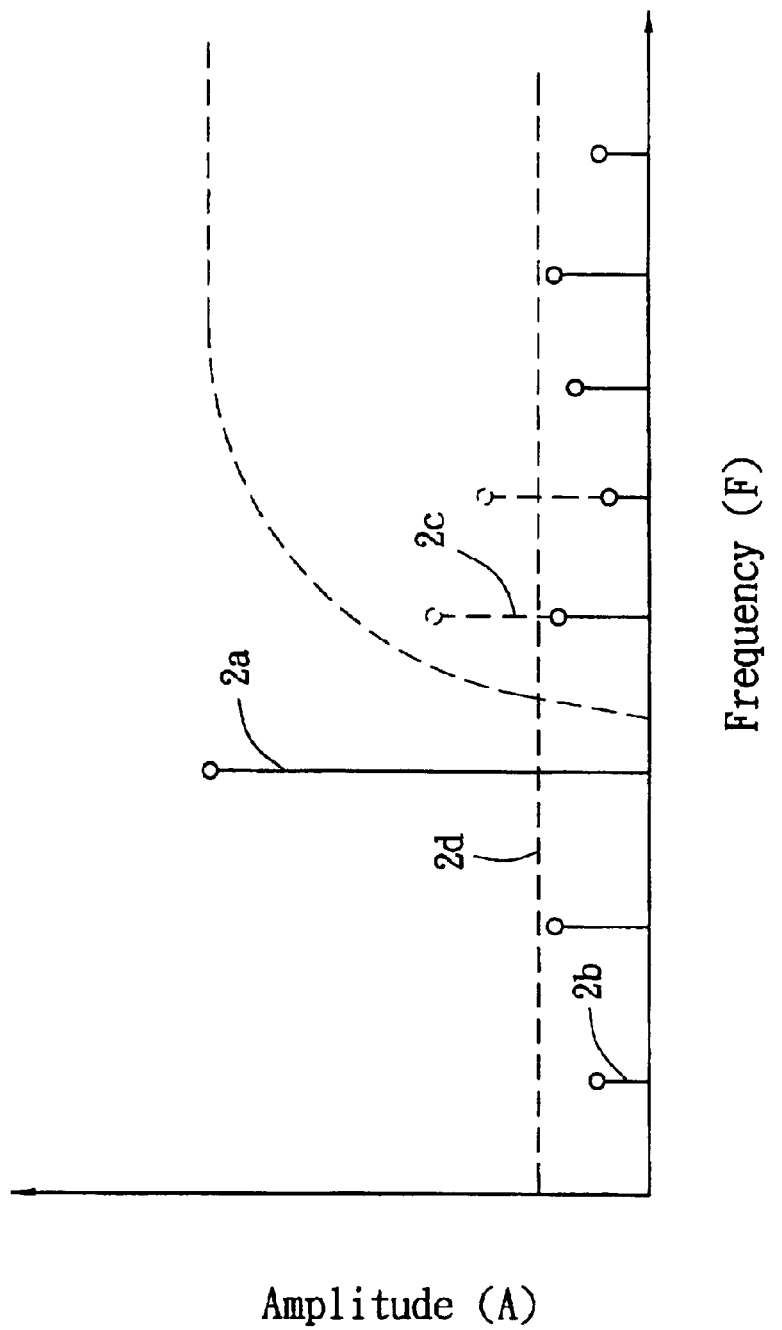
FIG. 6 is an illustrative diagram of the spectrum of FIG. 5
Figure 7:
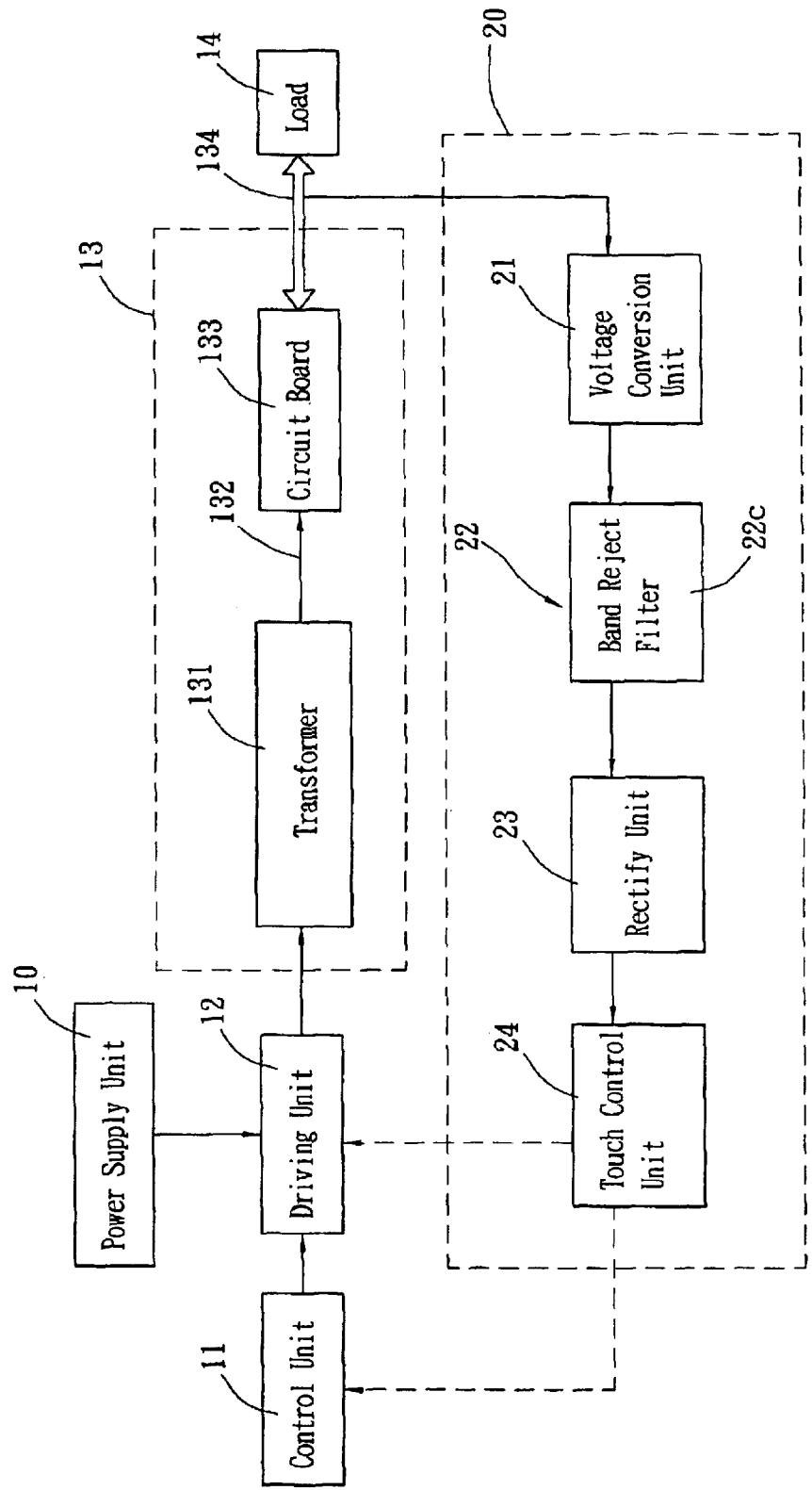
FIG. 7 is a block diagram of the circuit of a band reject filter of this invention.
Figure 8:
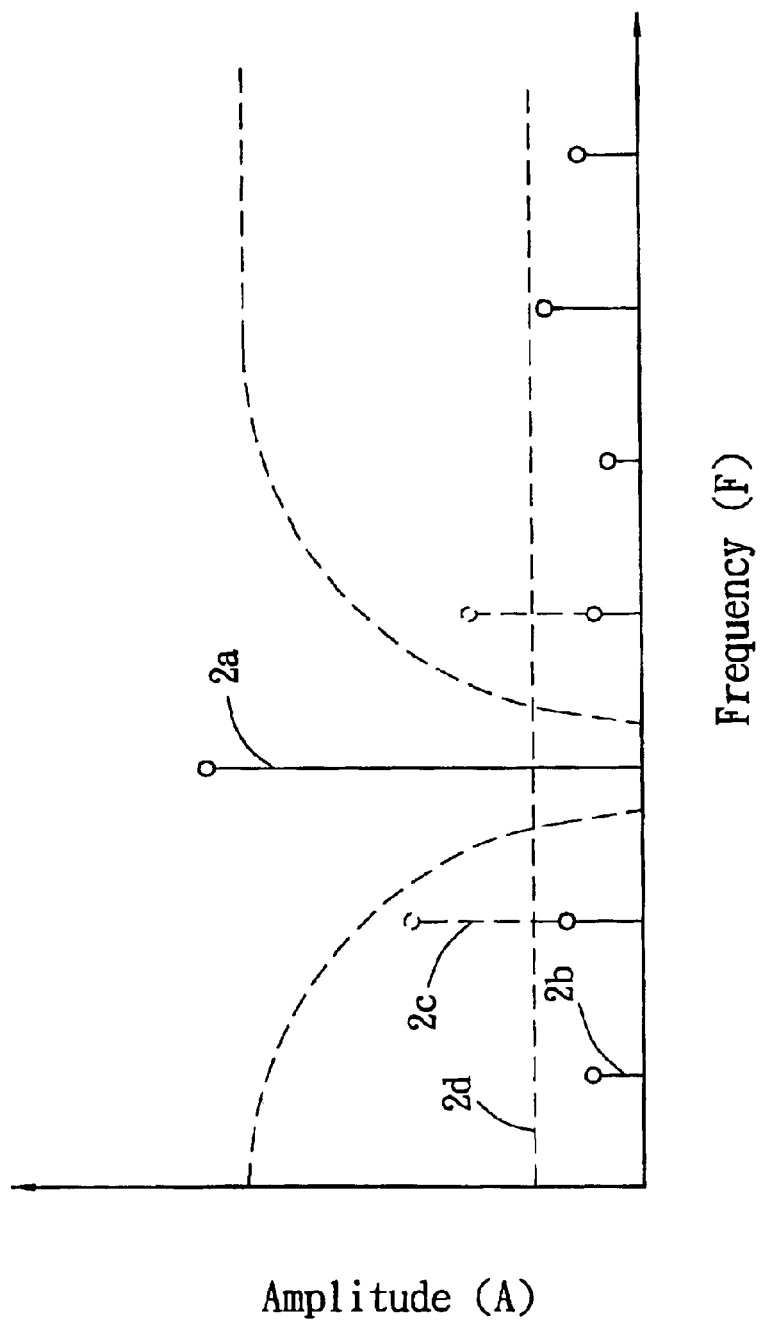
FIG. 8 is an illustrative diagram of the spectrum of FIG. 7.

The foregoing filter unit could be a low pass filter 22a, a high pass filter 22b, or a band reject filter 22c comprised of a low pass filter 22a and a high pass filter 22b. FIGS. 3, 5, and 7 respectively depict the illustrative diagrams of their circuit, and FIGS. 4, 6, and 8 respectively show the illustrative diagram of the spectrum (x-axis indicates the amplitude and y-axis indicates the frequency) for each embodiment. In the normal operating state of the high-voltage output area, there is still some wave clutters produced in addition to the high-voltage operating frequency 2a. Then, the wave unit 22 provides frequency and potential 2d to select the wave clutter 2b, such that it output waveform and efficiency can be maintained at a certain level.

If any position of the foregoing high-voltage output area does not allow the load 14 to cause the electric discharge phenomenon by the high voltage drive due to the damage or breakage, then the abnormal frequency signal 2c which exceeds the potential 2d determined by the filter unit 22 will pass through the filter unit 22 into the rectify unit 23. Then, after the rectify unit rectifies the abnormal frequency signal 2c to an arc wave clutter, the touch control unit 24 will detect and trigger a signal to stop the control unit 11 or the driving unit 12. As a result, it immediately stops the high voltage conversion and output, and thus will not produce the arc discharge effect anymore. Of course, the peripheral components will not accumulate heat or produce sparks, and thus preventing the occurrence of burning or accidents.

What is claimed is:

1. An arc discharge protection device for eliminating an arc discharge effect produced by an abnormal phenomena in a high-voltage output area having a power supply unit for supplying electric power, a control unit for providing a voltage distribution signal, a driving unit for receiving said power supply and voltage distribution signal, a step-up unit for receiving said voltage after the conversion and converting said voltage into a high voltage, and a load with a high-voltage output coupled to said step-up unit, comprising:

a voltage conversion unit, for receiving a high-voltage arc discharge signal released from said high-voltage output area and converting said high-voltage arc discharge signal into a low-voltage arc discharge signal;

a filter unit, for receiving said low-voltage arc discharge signal of said voltage conversion unit and determining a potential and filtering an abnormal frequency signal;

a rectify unit, for receiving said abnormal frequency signal of said filter unit, and outputting an arc wave clutter after performing the rectification;

a touch control unit, for detecting said arc wave clutter and outputting a trigger signal to stop the operation of one selected from the group of said control unit and said driving unit to prevent said arc discharge effect.

2. The arc discharge protection device according to claim 1, wherein said filter unit is a low pass filter.

3. The arc discharge protection device according to claim 1, wherein said filter unit is a high pass filter.

4. The arc discharge protection device according to claim 1, wherein said filter unit is a band reject filter comprised of a low pass filter and a high pass filter.

5. The arc discharge protection device according to claim 1, wherein said voltage conversion unit uses a voltage divide circuit comprised of a plurality of resistors.

6. The arc discharge protection device according to claim 1, wherein said rectify unit is a rectify circuit comprised of a diode and a capacitor.

7. The arc discharge protection device according to claim 1, wherein said touch control unit is a silicon controlled rectifier.

8. The arc discharge protection device according to claim 1, wherein said touch control unit is a flip-flop.

9. The arc discharge protection device according to claim 1, wherein said step-up unit comprises a transformer and a circuit board.

* * * * *